(12) United States Patent
Ishigami et al.

(10) Patent No.: US 7,235,774 B2
(45) Date of Patent: Jun. 26, 2007

(54) OPTICAL MODULE

(75) Inventors: Yoshiaki Ishigami, Hitachi (JP);
Yoshinori Sunaga, Hitachinaka (JP);
Kenichi Tamura, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/417,119

(22) Filed: May 4, 2006

(65) Prior Publication Data

US 2006/0249661 A1   Nov. 9, 2006

(30) Foreign Application Priority Data

Nov. 2, 2005   (JP) .............................. 2005-319849

(51) Int. Cl.
*H01J 3/14* (2006.01)
*G02B 6/42* (2006.01)
(52) U.S. Cl. .................... 250/216; 250/227.11; 385/33
(58) Field of Classification Search ................ 250/216, 250/227.11, 227.24, 227.28, 227.29; 385/9, 385/12, 33; 396/141, 142
See application file for complete search history.

(56) References Cited

U.S. PATENT DOCUMENTS 6,807,336 B2 * 10/2004 van Haasteren ............. 385/33

2006/0219879 A1 * 10/2006 Katou et al. ........... 250/227.21

FOREIGN PATENT DOCUMENTS

JP         2002-221642        8/2002
JP         2005-31556         2/2005

* cited by examiner

*Primary Examiner*—Kevin Pyo
(74) *Attorney, Agent, or Firm*—McGinn IP Law Group, PLLC (57) ABSTRACT

An optical module is provided with an optical waveguide array comprising plural optical transmission lines; a photoelectric element array comprising plural photoelectric elements for respectively receiving or transmitting optical signals from or to the optical transmission lines of the optical waveguide array; and a lens component interposed between the photoelectric element array and the optical waveguide array, and having first and second convex lenses respectively placed opposite the optical waveguide array and the photoelectric element array, and respectively having effective diameters larger than the distance between the respective optical axes of the mutually most-distant two optical transmission lines of the optical waveguide array, and the distance between the respective optical axes of the mutually most-distant two photoelectric elements of the photoelectric element array.

15 Claims, 8 Drawing Sheets

OPTICAL MODULE

The present application is based on Japanese patent application No. 2005-319849, the entire contents of which are incorporated herein by reference.

BACKGROUND OF THE INVENTION

1. Field of the Invention

The present invention relates to an optical module for transmitting, receiving or transmitting/receiving plural optical signals.

2. Description of the Related Art

At distal ends of optical communication systems, an optical module is used for transmitting/receiving optical signals converted from electrical signals to/from optical transmission lines, respectively, such as optical fibers. Particularly, an optical module is used that has a PD array or an LD array packaged therein to transmit or receive plural optical signals.

Figure 15:
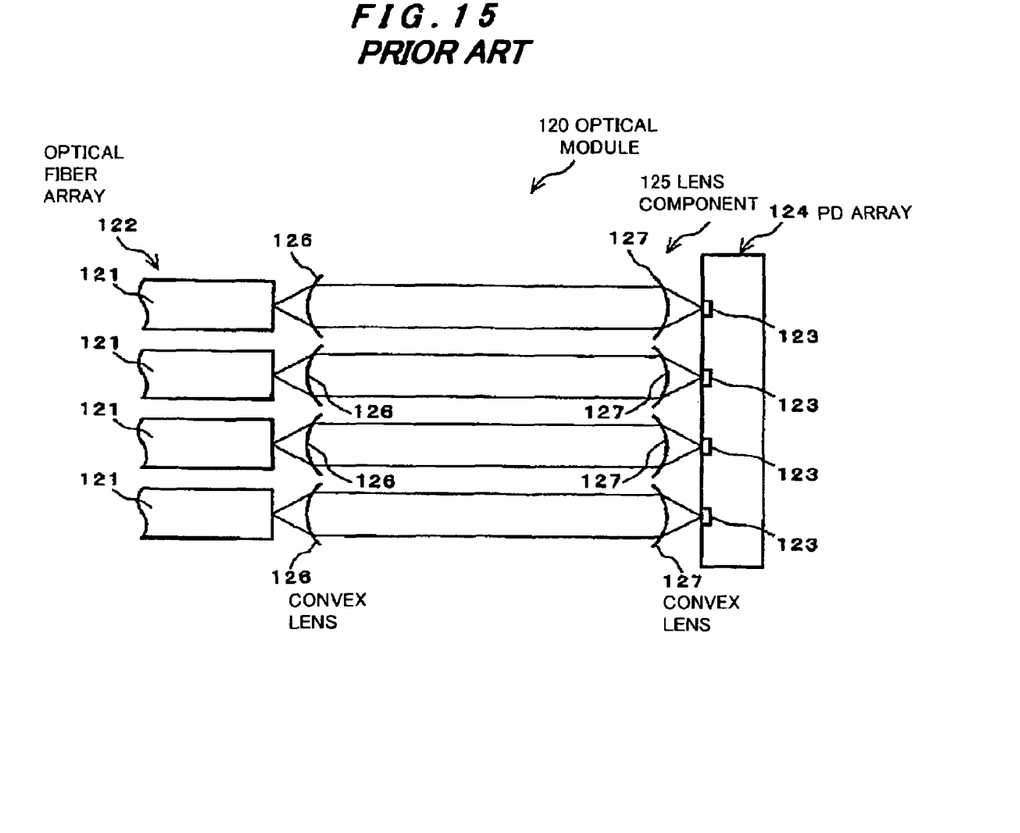
FIG. 15 is an explanatory view showing a conventional optical module.

FIG. 15 is a plan view for explaining a reception optical module that receives respective optical signals from plural optical fibers with plural light-receiving elements (e.g., photodiodes: PDs) respectively.

As shown in FIG. 15, an optical module 120 comprises an optical fiber array 122 having plural optical fibers 121, a PD array 124 having plural light-receiving elements (PDs) 123 for respectively receiving respective optical signals from the optical fibers 121 of the optical fiber array 122, and a lens component 125 interposed between the PD array 124 and the optical fiber array 122 for discretely guiding the optical signals between the optical fibers 121 of the optical fiber array 122 and the corresponding PDs 123 of the PD array 124. The lens component 125 is provided with plural optical fiber side convex lenses 126 and plural PD side convex lenses 127.

The respective optical signals emitted from the optical fibers 121 are collimated by the optical fiber side convex lenses 126 respectively, so that each collimated light (parallel light) is collected by the PD side convex lenses 127 respectively, and received by the corresponding PDs 123 substantially at focal position. In this optical module, because one set of the convex lenses (micro lenses) is provided for each optical fiber and PD corresponding thereto, the respective optical signals from the optical fibers 121 can be discretely coupled to the PDs 123 (See JP-A-2005-31556).

The lens component 125 packaged in the conventional optical module 120 uses the plural micro lenses arranged parallel to each other to discretely collimate the plural optical signals. However, for example, because of a specified spacing between the PDs 123 of the PD array 124, in the case of a small spacing (pitch) between the optical fibers 121 or the PDs 123, the diameter (effective diameter or aperture) of the convex lenses has to be small. Also, the NA (No. of apertures) of the optical fibers 121 is predetermined, and light (optical signals) are emitted therefrom with a predetermined expansion angle. Thus to inject light emitted from the optical fibers 121 into a small diameter lens without loss, i.e., to inject thereinto light when the beam diameter of the emitted light is smaller than the diameter of the lens), the LDs or PDs 123 have to be provided right close to the PD side convex lenses 127 of the lens component 125.

However, for the structural reason of LD or PD packages with LDs or PDs, there is the problem that they cannot be arranged within the focal distance of the lenses. That is, there is the problem that LDs or PDs cannot be arranged in a desired position in the optical module, regardless of structure of LD or PD packages.

Also, generally, convex lenses that are slightly contaminated with dust degrade optical signals transmitted therethrough. In the conventional optical module 120, because the diameter of the convex lenses is small and the size ratio of contamination to lens diameter (optical signal diameter) is therefore large, there is the problem that contamination adhering to lens surface degrades optical signals.

Figure 16:
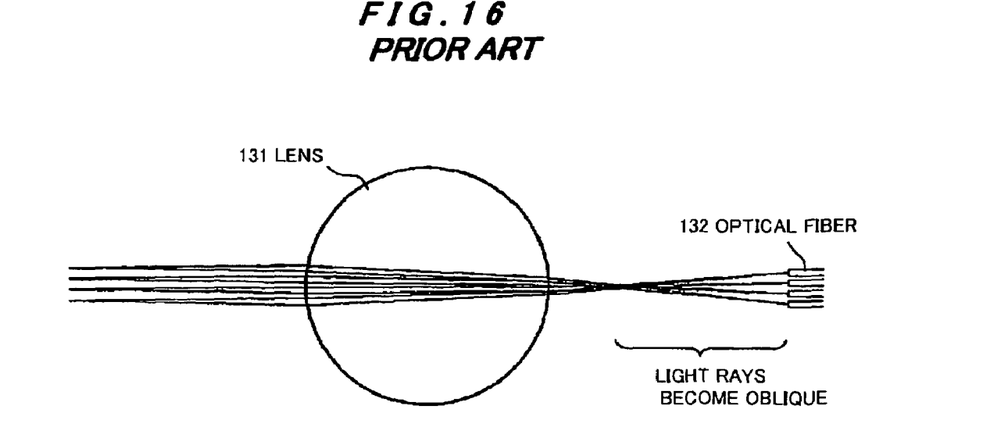
FIG. 16 is an explanatory view showing a conventional lens component.

As shown in FIG. 16, in collecting plural (e.g., four) optical signals to plural optical fibers 132 arranged at a specified interval, when the plural optical signals are injected into one lens 131 having a diameter that allows them to be injected thereinto, the respective optical axes of the optical signals passed through the lens 131 are not parallel to each other, to be injected obliquely into the plural optical fibers 132 respectively arranged parallel to each other, which therefore causes coupling loss.

SUMMARY OF THE INVENTION

Accordingly, it is an object of the present invention to provide an optical module, which is capable of obviating the above problems, and of transmitting/receiving plural optical signals without causing deterioration, and of arranging LDs or PDs at desired position in the optical module.

According to the invention, an optical module comprises:

an optical waveguide array comprising plural optical transmission lines;

a photoelectric element array comprising plural photoelectric elements for respectively receiving or transmitting optical signals from or to the optical transmission lines of the optical waveguide array; and a lens component interposed between the photoelectric element array and the optical waveguide array for discretely transmitting or receiving the optical signals between the optical transmission lines of the optical waveguide array and the corresponding photoelectric elements of the photoelectric element array, wherein the lens component comprises:

a first convex lens placed opposite the optical waveguide array and having an effective diameter larger than the distance between the respective optical axes of the mutually most-distant two optical transmission lines of the optical waveguide array, and a second convex lens placed opposite the photoelectric element array and having an effective diameter larger than the distance between the respective optical axes of the mutually most-distant two photoelectric elements of the photoelectric element array, and wherein the first convex lens is formed to cause the respective optical signals from the optical transmission lines of the optical waveguide array to form parallel light, or collect the optical signals passed through the lens component into the optical transmission lines respectively, the second convex lens is formed to cause the respective optical signals from the photoelectric elements of the photoelectric element array to form parallel light, or collect the optical signals passed through the lens component into the photoelectric elements respectively, and the optical signals that have respectively formed the parallel light through the lens component cross each other substantially in one area.

In the above invention, the following modifications and changes can be made.

(a) The lens component is formed in a columnar shape, so that the first convex lens is formed at one end of the column, while the second convex lens is formed at the other end thereof.

(b) The lens component is formed with a substantially rectangular parallelepiped lens block, so that the first convex lens is formed on one side of the lens block, while the second convex lens is formed on the opposite side to the side on which is formed the first convex lens.

(c) The lens component is formed with a substantially rectangular parallelepiped lens block, so that the first convex lens is formed on one side of the lens block, while the second convex lens is formed on a side of the lens block orthogonal to the side on which is formed the first convex lens, and a mirror is formed in the lens block for joining the respective optical axes of the first and second convex lenses.

(d) The lens component is formed with a substantially rectangular parallelepiped lens block, so that a pair of the first convex lenses are formed on one side of the lens block, while one second convex lens is formed on the opposite side of the lens block to one of the first convex lenses, and another second convex lens is formed on a side of the lens block orthogonal to the other of the first convex lenses, and a mirror is formed between said other first convex lens and said another second convex lens.

(e) The focal distance of the first convex lens is different from the focal distance of the second convex lens.

(f) The optical waveguide array comprises plural optical fibers arrayed one-dimensionally or two-dimensionally.

(g) The photoelectric element array comprises plural light-receiving or light-emitting elements arrayed one-dimensionally or two-dimensionally.

(h) The photoelectric element array is provided on a substrate, and a cap with an optically transparent window formed above the photoelectric element array is fixed to the substrate, for airtight sealing of the photoelectric element array.

In the above item (c) or (d), the following modifications and changes can be made.

(i) In the lens block is formed a hollow hole for forming the mirror at a position of joining the respective optical axes of the first and second convex lenses.

In the above item (b) or (c), the following modifications and changes can be made.

(j) The lens component is formed with the substantially rectangular parallelepiped lens block formed of a material that forms the first and second convex lenses;

on one side of the lens block is formed a recessed portion whose aperture is substantially equal to the aperture of the first convex lens, so that the first convex lens is formed in the recessed portion; and on the other side of the lens block is formed a recessed portion whose aperture is substantially equal to the aperture of the second convex lens, so that the second convex lens is formed in the recessed portion.

In the above item (j), the following modifications and changes can be made.

(k) In the face of the lens block for forming the first or second convex lens is formed an engagement projection or an engagement groove positioned for engaging an external component such as an optical connector; and the recessed portion is formed to a depth at which the focus of the second convex lens is positioned on the aperture plane of the recessed portion.

<Advantages of the Invention>

The present invention exhibits the excellent effect of being able to transmit/receive plural optical signals without causing deterioration, and of placing LDs or PDs at desired position in an optical module.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
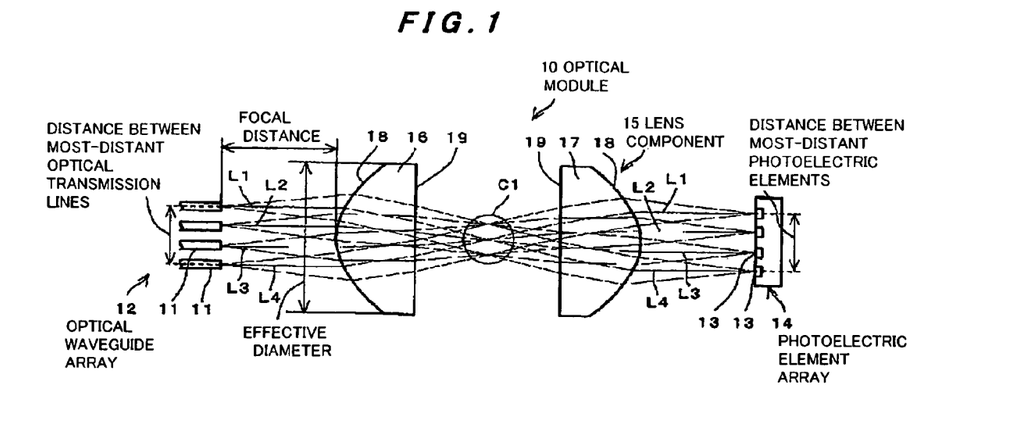
FIG. 1 is a plan view showing an optical module according to a first preferred embodiment of the present invention.

As shown in FIG. 1, an optical module according to this embodiment comprises an optical waveguide array 12 with plural optical transmission lines 11, a photoelectric element array 14 with plural photoelectric elements 13 for respectively receiving optical signals L1–L4 from the optical transmission lines 11 of the optical waveguide array 12, and a lens component 15 for discretely transmitting or receiving the optical signals L1–L4 between the photoelectric element array 14 and the optical waveguide array 12.

The plural optical transmission lines 11 are aligned so that the respective optical axes of the optical transmission lines 11 are parallel to each other. An optical fiber is used as the optical transmission lines 11, and an optical fiber array or planar optical waveguide device as the optical waveguide array 12. The photoelectric element array 14 comprises the photoelectric elements 13 aligned so that their light-receiving surfaces face in the same direction (the respective optical axes of the light-receiving surfaces are parallel to each other) The photoelectric element array 14 is exemplified by a photodiode array (a PD array). The photoelectric elements 13 are exemplified by a light-receiving element for receiving optical signals, preferably a photodiode. In this embodiment, to receive optical signals of four channels, there are provided four optical transmission lines 11 and four photoelectric elements 13.

The lens component 15 comprises a first and a second convex lens 16 and 17. The first convex lens 16 is placed opposite the optical waveguide array 12, and has an effective diameter larger than the distance between the optical axes of the most-distant two optical transmission lines 11 of the optical waveguide array 12. The second convex lens 17 is placed opposite the photoelectric element array 14, and has an effective diameter larger than the distance between the optical axes of the most-distant two photoelectric elements 13 of the photoelectric element array 14.

In this embodiment, the first and second convex lenses 16 and 17 are formed of materials that are the same in refractive index, lens diameter (effective diameter), and curvature. The first and second convex lenses 16 and 17 are placed opposite each other.

The first convex lens 16 has an aspherical lens surface 18 on the optical waveguide array 12 side. The second convex lens 17 has an aspherical lens surface 18 on the photoelectric element array 14 side. The first and second convex lenses 16 and 17 have a flat surface 19 on the opposite side to the other convex lens. In this embodiment, the lens surface 18 is formed aspherically, but may be formed spherically. In this embodiment, also, the mutually opposite surfaces of the first and second convex lenses 16 and 17 are flat, but may be in either of concave or convex shape.

Further, the first and second convex lenses 16 and 17 are formed and placed to cause plural optical signals L1–L4 to propagate through optical paths as will be explained below.

Respective optical signals L1–L4 emitted from the optical transmission lines 11 expand their beam diameter to be passed into the first convex lens 16. The optical signals L1–L4 are refractively changed at the lens surface 18 and the flat surface 19. The optical signals L1–L4 passed through the first convex lens 16 are deflected to be parallel to their respective optical axes (principal light rays) to be passed to the second convex lens 17. In this case, of the plural optical signals L1–L4, the optical signal that enters the more outer side of the first convex lens 16 has a larger optical axis deflection angle (propagation angle), and the optical signal that is closer to the center of the first convex lens 16 has a smaller optical axis deflection angle. Accordingly, the plural optical signals L1–L4 passed through the first convex lens 16 to respectively form parallel light cross each other substantially in one area (indicated by circle C1 in the figure).

The optical axes of the collimated parallel light at the first convex lens 16 are made parallel to each other at the second convex lens 17, and each parallel light is collected to respective photoelectric elements 13.

In FIG. 1, although the optical module has been explained in which the light-receiving element is used as the photoelectric elements 13 to receive light emitted from the optical fiber, a light-emitting element may also be used as the photoelectric elements 13 to inject light emitted from the light-emitting element into the optical fiber. A laser diode (an LD) is preferable as the light-emitting element, and a laser diode array (an LD array) as the photoelectric element array 14. In this case, the respective plural optical signals emitted from the photoelectric elements propagate in the opposite direction to the propagation direction of the optical signals shown in FIG. 1, and the other operation is the same.

According to the optical module 10 of this embodiment, when the plural optical signals are caused to propagate discretely, because the convex lens is used that has an effective diameter larger than the distance between the optical axes of the most-distant optical transmission lines 11, even if the distance between the lens component 15 and optical waveguide array 12 is made larger than the conventional optical modules, the respective optical signals emitted from the optical transmission lines 11 to expand with a specified expansion angle can be injected into the lens component 15 without loss.

Accordingly, because it is possible to increase the focal distance of light passed into or from the lens component 15 without loss of the optical signals, compared to the conventional lens components, the photoelectric element array 14 and the optical waveguide array 12 can be optically connected to the lens component 15 at a desired position. For example, it is possible to optically connect to the lens component 15 an LD array or a PD array which could not be optically connected thereto if the distance thereto from the lens component 15 is not more than the specified length because the structure and size of the photoelectric element array 14 are specified (its standard is predetermined), and to thereby realize an optical module in which such an LD array or a PD array is integrally optically connected to the lens component 15.

As another example, an optical element, such as a cap for airtight sealing (that will be described later in a fifth embodiment), an isolator, or the like, may be interposed between the photoelectric element array and the convex lens.

Also, because the lens component 15 allows the respective optical axes of the optical signals L1–L4 to be passed therefrom to be parallel to each other, the embodiment, where a light-emitting element is used as the photoelectric elements 13 to inject light emitted from the light-emitting element into the optical fibers, allows each optical fiber to receive it without degrading optical properties (esp. optical intensity) of the optical signals.

Further, because in the optical module 10, the diameter of the first and second convex lenses 16 and 17 of the lens component 15 is made large compared to that of the convex lenses 126 and 127 of the conventional optical module 120 (see FIG. 15), and the distance between the optical waveguide array 12 and the photoelectric element array 14, and the lens component 15 is made long compared thereto, to diametrically expand the optical signals and enter the lens component 15, it is possible to reduce detrimental effects of contamination adhering to the lens surface 18, on the optical signals.

An optical module of a second embodiment will be explained next.

Figure 2:
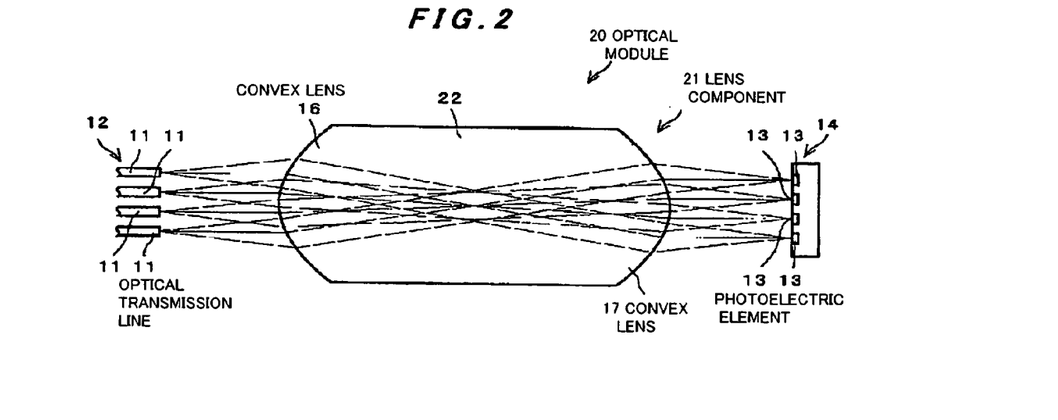
FIG. 2 is a plan view showing an optical module according to a second preferred embodiment of the present invention.

As shown in FIG. 2, an optical module 20 of this embodiment comprises a columnar lens component 21, a first convex lens 16 formed at one end of the columnar lens component 21, and a second convex lens 17 formed at the other end thereof.

Specifically, the lens component 21 is formed of the same material such that the first and second convex lenses 16 and 17 are integral with each other via a lens-to-lens component 22. While in the optical module 10 of FIG. 1, the medium between the first and second convex lenses 16 and 17 is air, the optical module 20 of this embodiment is different therefrom in that the medium between the first and second convex lenses 16 and 17 is formed of the material whose refractive index is the same as that of both these first and second convex lenses 16 and 17.

In the lens component 21, plural optical signals respectively forms parallel light, and cross each other substantially in one area, similarly to the optical module 10 of FIG. 1. It should be noted that because of no boundary of refractive index in the lens component 21, no refractive change occurs at the flat surface 19, as in FIG. 1.

Because the lens component 21 comprises the first and second convex lenses 16 and 17 formed integrally with each other, there is the advantage that once the lens component 21 is formed, no optical axis adjustment between the lens is required.

An optical module of a third embodiment will be explained next.

Figure 3:
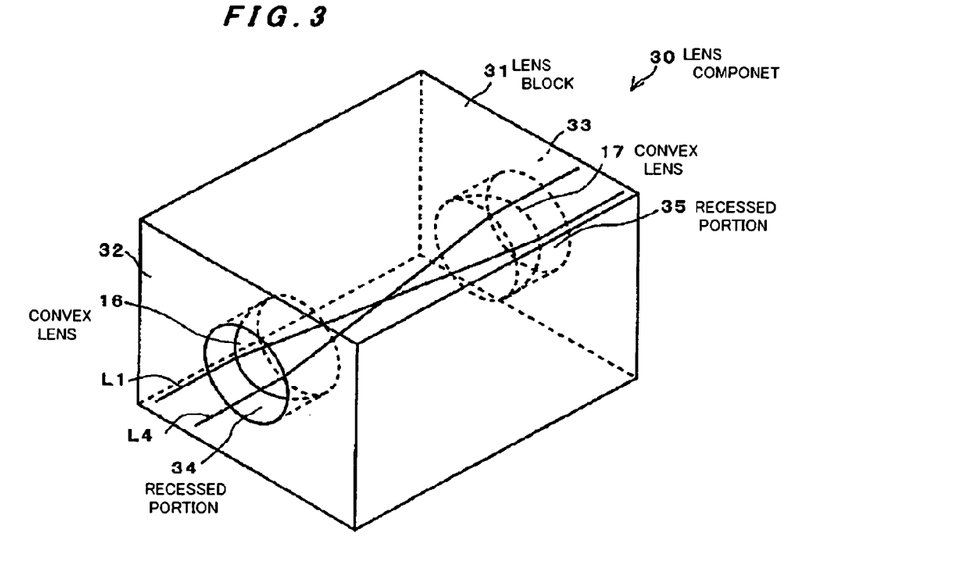
FIG. 3 is a perspective view showing a lens component of an optical module according to a third preferred embodiment of the present invention.

As shown in FIG. 3, in this embodiment, a lens component 30 includes first and second convex lenses 16 and 17, and a substantially rectangular parallelepiped lens block 31, in which the first convex lens 16 is formed in one face 32 of the lens block 31, and the second convex lens 17 is formed in the opposite face 33 of the lens block 31 to the face 32 in which is formed the first convex lens 16.

Specifically, in one face 32 of the lens block 31 is formed a columnar recessed portion 34 whose diameter is substantially equal to the diameter of the first convex lens 16, and at the bottom of the recessed portion 34 is provided the first convex lens 16. Likewise, in the opposite face 33 of the lens block 31 is formed a same-shape recessed portion 35, and at the bottom of the recessed portion 35 is provided the second convex lens 17. The first and second convex lenses 16 and 17 and the lens block 31 are integrally formed of the same material, and the material which forms the lens block 31 is also substantially provided between the first and second convex lenses 16 and 17. In this embodiment, the lens component 30 is formed of resin. In the optical module of this embodiment, the lens component 30 is equivalent to the lens component 21 shown in FIG. 2 in optical signal propagation, and serves to have the effect analogous to the optical module 20 of FIG. 2.

Figure 4:
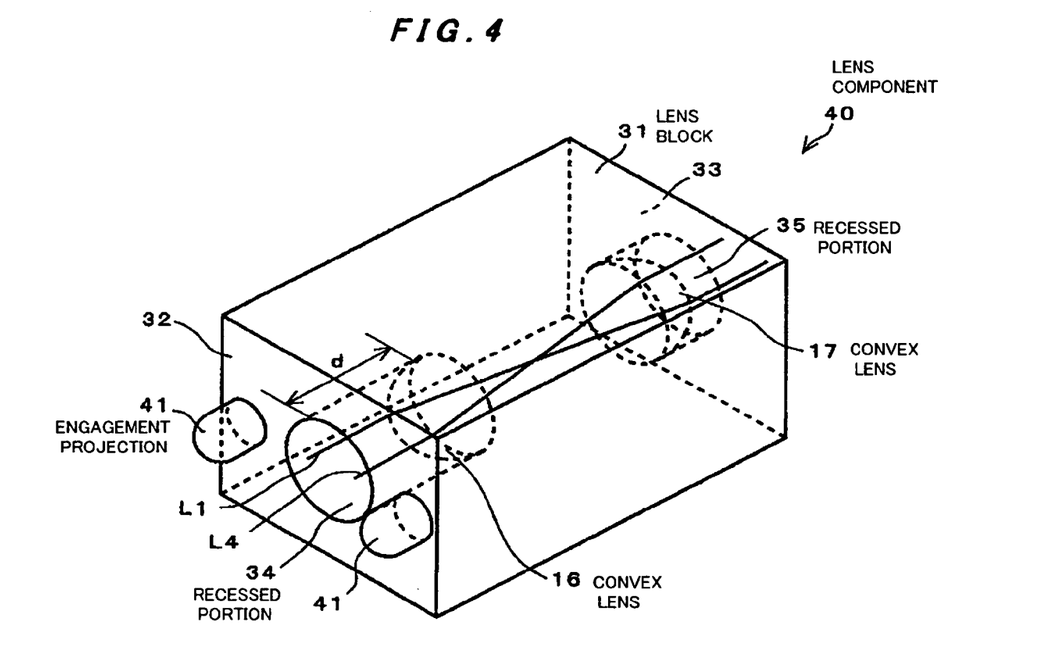
FIG. 4 is a plan view showing a modified lens component of FIG. 3.
Figure 5:
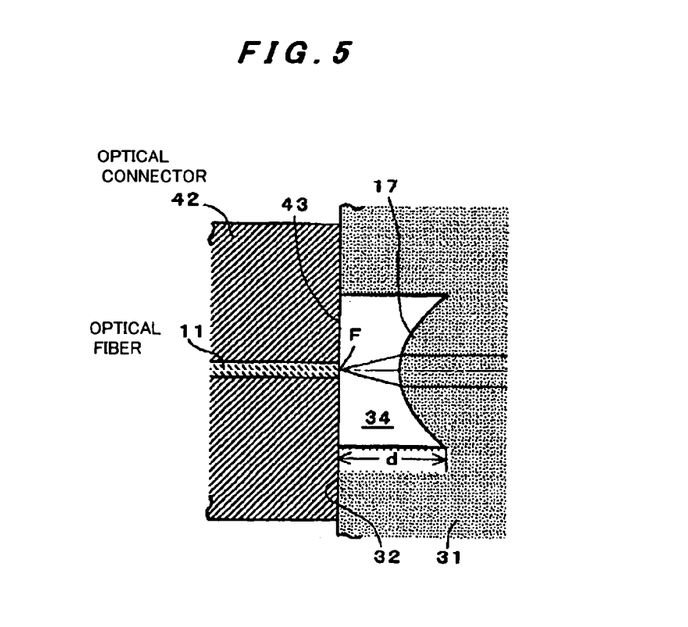
FIG. 5 is a cross-sectional view showing connection between the lens component of FIG. 4 and an optical connector.

Further, as shown in FIG. 4, in the face 32 in which is formed the first convex lens 16, there may be formed (in the figure, two) engagement projections 41 positioned for engaging an external component such as an optical connector to which is connected an optical fiber. As shown in FIG. 1, the first convex lens 16 is focused to the optical waveguide array 12 such as the optical fiber array. Where engagement grooves are formed in an end face of the optical connector to which is connected an optical fiber, an emission end face of the optical connector is positioned to a position at which are collected plural optical signals, to form the engagement projections 41. Also, at the same time, the depth d of the recessed portion 34 is adjusted. Specifically, as shown in FIG. 5, the depth d of the recessed portion 34 is adjusted to position the focus F of the first convex lens 16 in an aperture plane 43 of the recessed portion 34. This allows the focus of the first convex lens 16 to be positioned in the end face of the optical fiber 11 accommodated in the optical connector 42, only by bringing the optical connector 42 into contact with the face 32 of the lens block 31. Accordingly, only by causing the engagement projections 41 of the lens component 40 (see FIG. 4) to engage the engagement grooves (not shown) of the optical connector 42, without core alignment, the optical axes of the optical signals are respectively aligned with the optical transmission lines of the optical connector, to enable the lens component 40 to be connected to the optical connector.

The engagement projections 41 may be formed in the face 33 in which is formed the second convex lens 17, or also be formed in both the faces 32 and 33 of the lens block 31. Further, where engagement projections 41 are formed in an external component such as an optical connector, engagement grooves may be formed in place of the engagement projections 41.

An optical module of a fourth embodiment will be explained next.

Figure 6A:
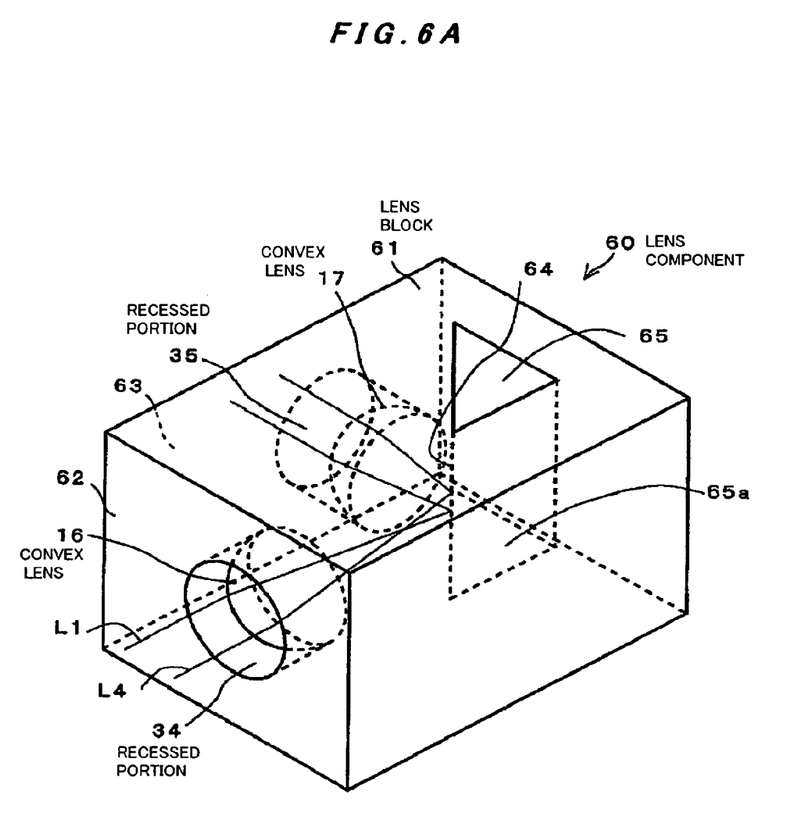
FIGS. 6A and 6B are respectively a perspective view showing detail of a lens component of an optical module according to a fourth preferred embodiment of the present invention, and a top plan view of the lens component of FIG. 6A.
Figure 6B:
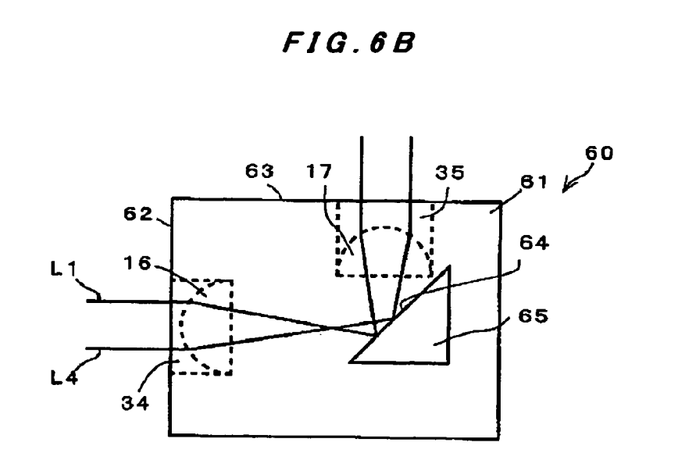

As shown in FIGS. 6A and 6B, in the optical module of this embodiment, a lens component 60 includes first and second convex lenses 16 and 17, and a substantially rectangular parallelepiped lens block 61, in which the first convex lens 16 is formed in one face 62 of the lens block 61, and the second convex lens 17 is formed in a face 63 of the lens block 61 orthogonal to the face 62 in which is formed the first convex lens 16, and a mirror (a mirror surface) 64 is formed therebetween.

Specifically, in the lens block 61 is formed a hollow hole 65 for forming the mirror surface 64 at a position of joining the respective optical axes of the first and second convex lenses 16 and 17. In the lens component 60, the optical axes of the first and second convex lenses 16 and 17 are at right angles to each other, and the mirror surface 64 is formed to be inclined at about 45° relative to both the optical axes. Also, the depth of the hollow hole 65 may be such that its bottom 65a is positioned to be lower than the first convex lens 16 (the second convex lens 17), where the hollow hole 65 is formed from above the lens block 61.

Figure 7:
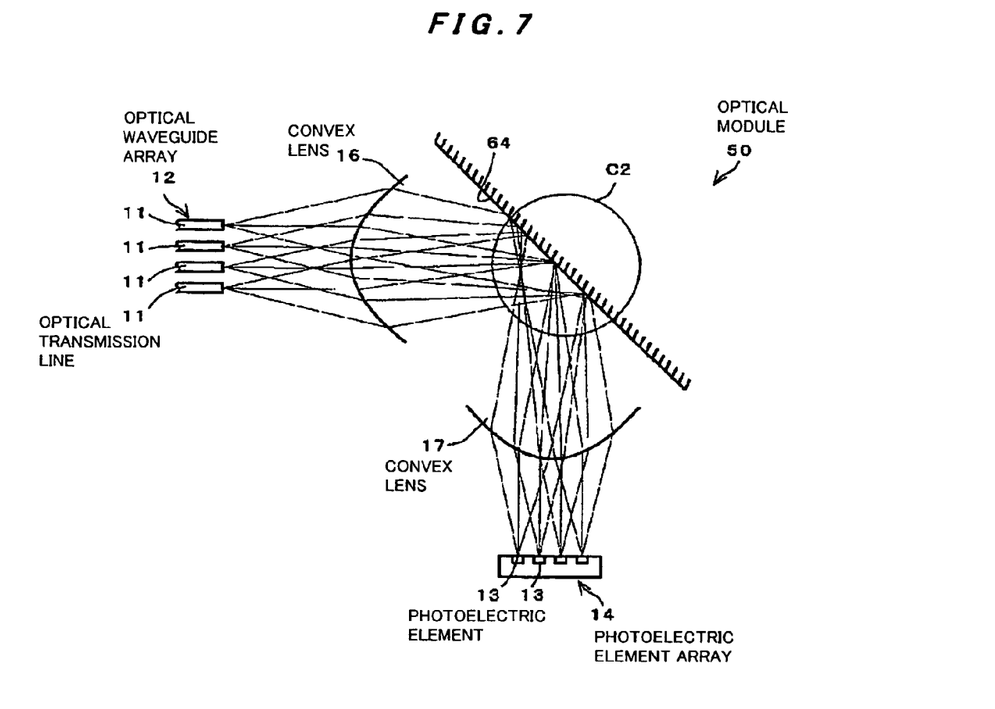
FIG. 7 is a plan view showing a fourth preferred embodiment of the present invention.

FIG. 7 is a plan view for explaining optical signal propagation through the optical module with the lens component 60 shown in FIG. 6.

As shown in FIG. 7, in an optical module 50, plural optical signals emitted from an optical waveguide array 12 keep respective optical axes parallel to each other to discretely diametrically expand to enter a first convex lens 16. In the first convex lens 16, the discrete optical signals respectively form parallel light, so that the respective optical axes of the plural optical signals are collected. The plural optical signals which have formed parallel light are reflected at the mirror 64, to be passed to a second convex lens 17. In the second convex lens 17, the respective optical axes of the plural optical signals are made parallel to each other, so that the discrete optical signals are respectively collected into photoelectric elements 13.

In this embodiment, although the mirror surface 64 is provided in a position (a circle C2 in the figure) in which the plural optical signals which have respectively formed parallel light cross each other substantially in one area, the mirror surface 64 may also be provided in a position of reflecting the plural optical signals which have respectively formed parallel light before or after they cross each other.

An optical module of a fifth embodiment will be explained next.

Figure 8:
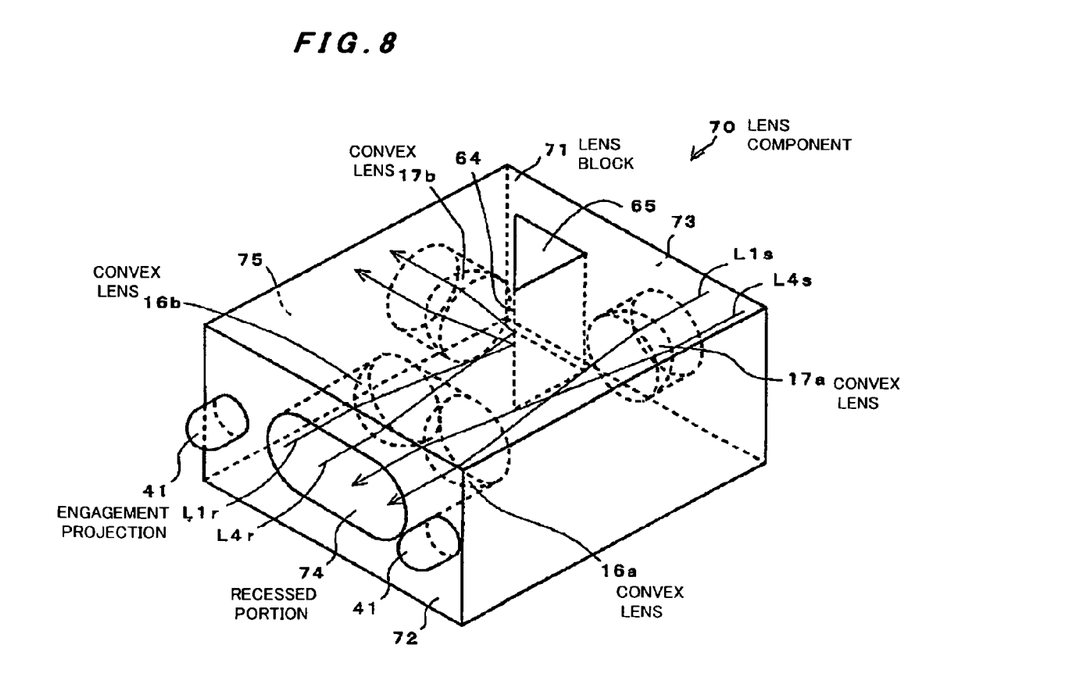
FIG. 8 is a perspective view showing a lens component of an optical module according to a fifth preferred embodiment of the present invention.

As shown in FIG. 8, in the optical module of this embodiment, a lens component 70 includes two first convex lenses 16a and 16b and two second convex lenses 17a and 17*b*, and a substantially rectangular parallelepiped lens block 71, in which one pair of the first convex lenses 16*a* and 16*b* are formed in one side face 72 of the lens block 71, and the second convex lens 17*a* is formed in a face 73 on the opposite side to the face 72 in which is formed the first convex lens 16*a*, and the second convex lens 17*b* is formed in a face 75 of the lens block 71 orthogonal to the first convex lens 16*b*, and a mirror 64 is formed to reflect and join the respective optical axes of the first and second convex lenses 16*b* and 17*b*. The mirror 64 is formed with a hollow hole 65 for forming the mirror surface 64 at a position at which the respective optical axes of the first and second convex lenses 16*b* and 17*b* are at right angles to each other.

Specifically, the lens component 70 in this embodiment is substantially the same as in the case where the lens component 40 shown in FIG. 4 and the lens component 60 shown in FIG. 6A are placed parallel to each other to be integrally formed by one lens block, in which the pair of the first convex lenses 16*a* and 16*b* are formed in one recessed portion 74.

The optical module in this embodiment comprises plural transmission optical fibers not shown connected as transmission optical waveguides to one first convex lens 16*a* side, plural reception optical fibers not shown connected as reception optical waveguides to the other first convex lens 16*b* side, an LD array not shown provided as a transmission photoelectric element array (a light-emitting element array) on one second convex lens 17*a* side, and an LD array not shown provided as a reception photoelectric element array (a light-receiving element array) on the other second convex lens 17*b* side.

In the optical module of this embodiment, optical signals (L1*s*, L4*s*) emitted from the light-emitting array propagate through the lens component 70 to the opposite transmission optical waveguide array, while optical signals (L1*r*, L4*r*) from the reception optical waveguides are reflected at the mirror 64 in the lens component 70 and received by the light-receiving element array.

An optical module using the lens component 70 of FIG. 8 will be explained.

As shown in FIGS. 9A–9D, the optical module 80 is optically connected to the lens component 70 by attaching a CAN-type PD 82 as a reception photoelectric element array and a CAN-type LD 83 as a transmission photoelectric element array to a lens accommodating portion 81 for accommodating the lens component 70 of FIG. 8. The CAN-type PD 82 is provided on a side that the second convex lens 17*b* of FIG. 8 faces, and the CAN-type LD 83 on a side that the second convex lens 17*a* of FIG. 8 faces. The optical module 80 is integrally provided with an optical transceiver case 84 into which is inserted a multicore connector with transmission and reception optical waveguide arrays connected to a side of the lens component 70 that the first convex lenses 16*a* and 16*b* pair of FIG. 8 face. There are provided an insertion slot 85 for inserting the multicore connector, and a locking member 86 for fixing the inserted multicore connector in the optical transceiver case 84.

Figure 10A:
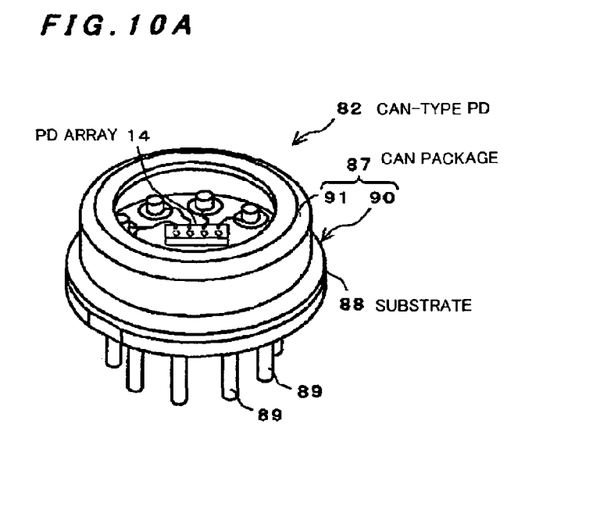
FIGS. 10A and 10B are respectively a perspective view and a cross-sectional view showing a CAN-type PD.
Figure 10B:
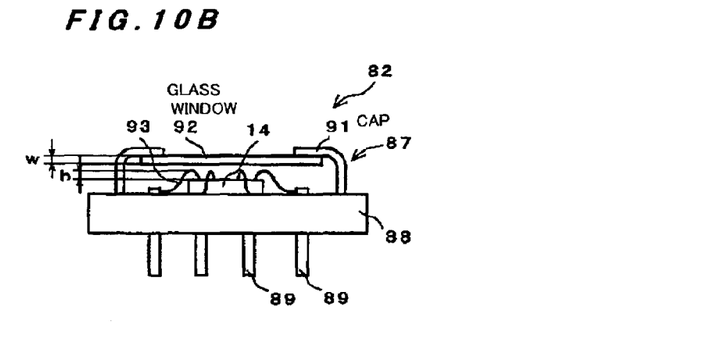

As shown in FIG. 10A, the CAN-type PD 82 has a PD array 14 packaged in a CAN package 87. The CAN package 87 comprises in a disc substrate 88 an associated circuit element (not shown) connected to the PD array 14, a CAN package body 90 electrically connected to the PD array 14 and the associated circuit element and provided with an input/output pin 89 passing through the substrate 88 to protrude from the substrate backside, and a cap 91 for airtight sealing of the PD array 14. As shown in FIG. 10B, the cap 91 has a top surface formed of an optically transparent (optical signal-transmitting) glass window 92, which covers the PD array 14 provided on the substrate 88 to form airtight space for accommodating the PD array 14. To maintain high air tight of the PD array 14, it is preferred that the cap 91 is fixed to the substrate 88 by means of welding with solder, low-melting point glass or silver solder.

It should be noted that, to package the CAN-type PD 82 in the optical module 80, the spacing between the PD array 14 and the second convex lens 17 has to be larger than the sum of thickness w of the glass window 92 and height h of bonding wires 93.

In the conventional optical modules, because the focal distance of the convex lens is shorter than the height of a peripheral wall of the cap covering the periphery of the PD array 14, i.e., the above-mentioned sum of thickness w of the glass window 92 and height h of bonding wires 93, it is impossible to package the CAN-type PD 82.

As shown in FIG. 8, however, because the optical module 80 of this embodiment comprises the lens component 70 provided with the second convex lens whose focal distance is made larger by increasing its effective diameter and curvature radius, it is possible to cause the focal distance of the second convex lens 17*b* to reach the PD array 14 in the CAN package 87, and thereby package the CAN-type PD 82.

Figure 9A:
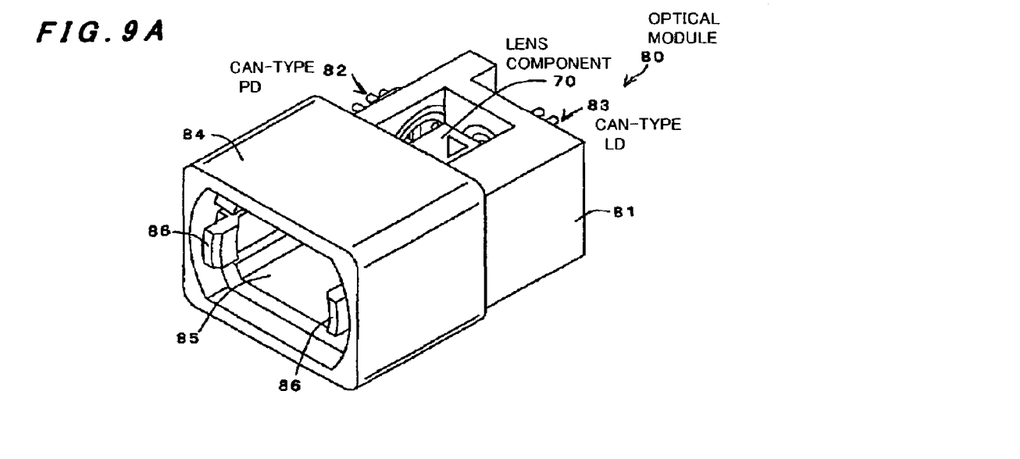
FIGS. 9A–9D are respectively a perspective view showing an optical module according to a fifth preferred embodiment of the present invention, a rear perspective view of the optical module of FIG. 9A, a front view of the optical module of FIG. 9A, and a side view of the optical module of FIG. 9A.
Figure 9B:
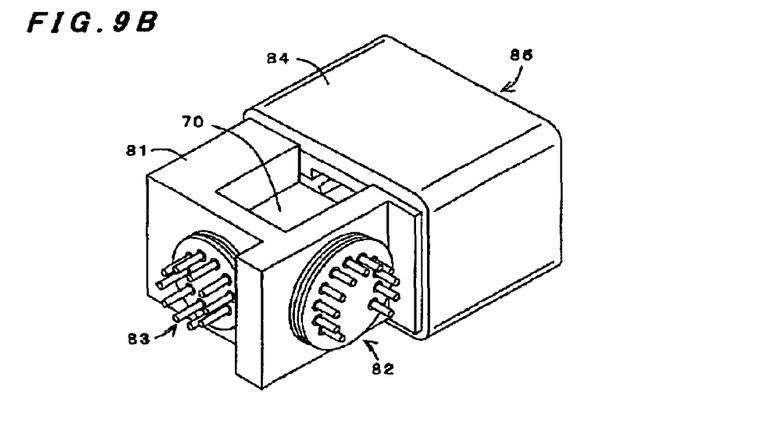
Figure 9C:
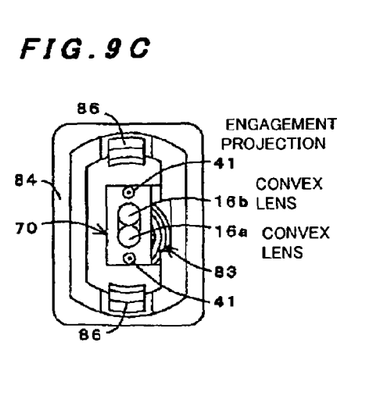
Figure 9D:
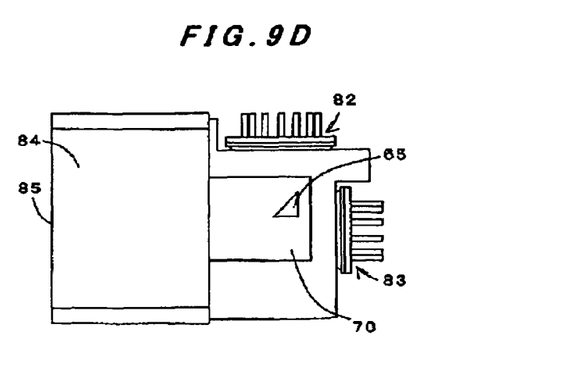

Thus because the optical module 80 of this embodiment allows the CAN-type PD 82 (the CAN-type LD 83) to be packaged for airtight sealing of the PD array 14 (the LD array), it is possible to enhance reliability and durability of the photoelectric elements without moisture, etc. penetrating into the PD array 14 from outside.

Also, use of the low-cost CAN package 87 allows ensuring a low-cost optical module.

Figure 11:
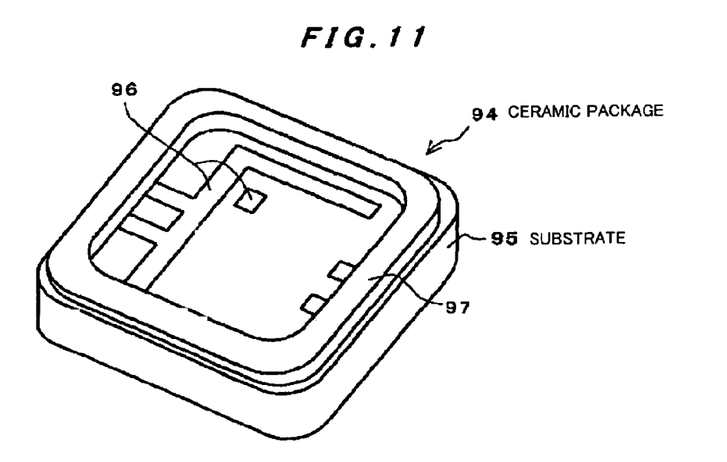
FIG. 11 is a perspective view showing a ceramic package.

Besides, a ceramic package provided with a glass cap for airtight sealing may be used in place of the CAN package 87. For example, a ceramic package 94 shown in FIG. 11 is generally used for packaging a crystal oscillator for making an electric module. The ceramic package 94 comprises an electrical wiring pattern 96 provided on a substrate 95 formed of ceramics, and a seam ring 97 provided along the periphery of the substrate 95. A glass window (not shown) is formed in upper surface of the seam ring 97. This allows the photoelectric element array disposed on the substrate 95 to be sealed airtight with the seam ring 97 and the glass window in the manner similar to the above cap 91.

In the first-fifth embodiments, the first and second convex lenses 16 and 17 is formed of the same material, but may be formed so that the lens surfaces 18 of the first and second convex lenses 16 and 17 are formed to have mutually different curvatures.

Figure 12:
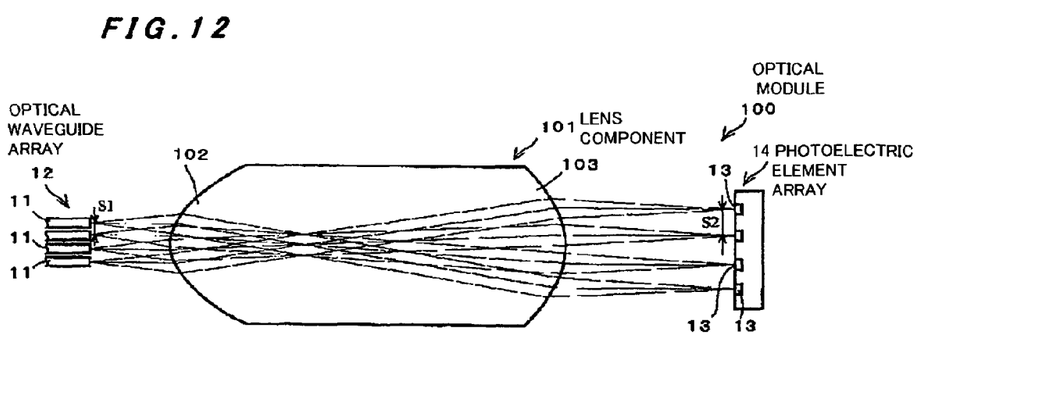
FIG. 12 is a plan view showing a modified lens component of the optical modules of the first to fifth preferred embodiments.

As shown in FIG. 12, a lens component 101 is formed so that the curvature of a second convex lens 103 is larger than the curvature of a first convex lens 102. This allows the focal distance of the second convex lens 103 to be longer than the focal distance of the first convex lens 102. Thus it is possible to package an optical waveguide array 12 and a photoelectric element array 14 by making different the distance between the lens component 101 and the optical waveguide array 12 (the focal distance of the first convex lens 102) and the distance between the lens component 101 and the photoelectric element array 14 (the focal distance of the second convex lens 103).

Also, in the lens component 101, the second convex lens 103 side focus-to-focus distance (pitch) S2 of each optical signal may be larger than the first convex lens 102 side focus-to-focus distance (pitch) S1. Accordingly, the first convex lens 102 side focus-to-focus distance S1 may be made different from the second convex lens 103 side focus-to-focus distance S2, so that it is possible to respectively align the optical axes with the plural photoelectric elements 13 or the plural optical transmission lines 11 for connecting the photoelectric element array 14 or the optical waveguide array 12, regardless of the pitch between the parallel photoelectric elements 13 or optical transmission lines 11.

In the optical modules explained above, to transmit and/or receive optical signals with four channels, the optical waveguide array 12 includes four one-dimensionally-arrayed optical transmission lines, and the photoelectric element array 14 includes four one-dimensionally-arrayed photoelectric elements. But the optical transmission lines 11 and photoelectric elements 13 may be arrayed two-dimensionally.

Figure 13:
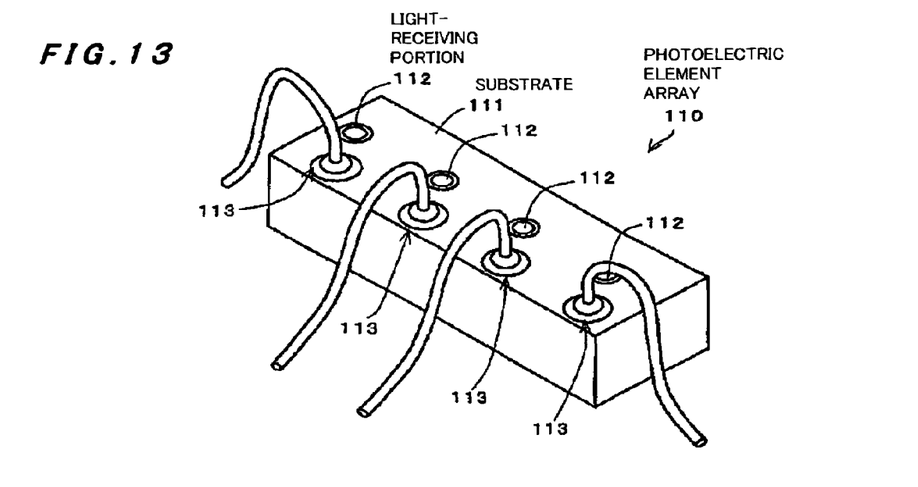
FIG. 13 is a perspective view showing an example of a photoelectric element array.
Figure 14:
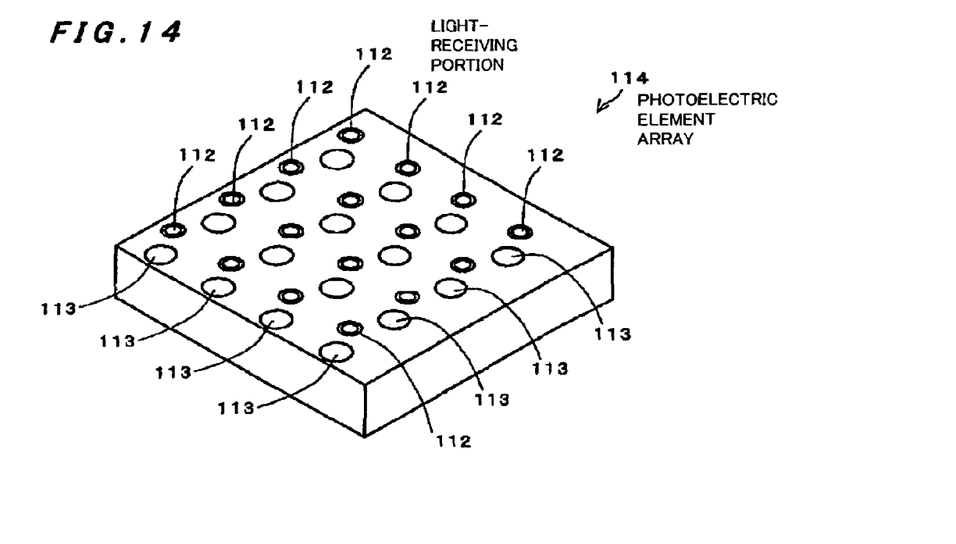
FIG. 14 is a perspective view showing another example of a photoelectric element array.

As shown in FIG. 13, for example, as a photoelectric element array, a one-dimensional photoelectric element array 110 may be used that has on a substrate 111 four aligned PDs comprising one set of light-receiving portions (light-receiving areas) 112 and electrical wire portions 113 respectively connected to the light-receiving portions 112. Besides, as shown in FIG. 14, a two-dimensional photoelectric element array 114 may be used that has one set of PDs arrayed four wide and four deep.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical module, comprising:
an optical waveguide array comprising plural optical transmission lines;
a photoelectric element array comprising plural photoelectric elements for respectively receiving or transmitting optical signals from or to the optical transmission lines of the optical waveguide array; and
a lens component interposed between the photoelectric element array and the optical waveguide array for discretely transmitting or receiving the optical signals between the optical transmission lines of the optical waveguide array and the corresponding photoelectric elements of the photoelectric element array,
wherein the lens component comprises:
a first convex lens placed opposite the optical waveguide array and having an effective diameter larger than the distance between the respective optical axes of the mutually most-distant two optical transmission lines of the optical waveguide array; and
a second convex lens placed opposite the photoelectric element array and having an effective diameter larger than the distance between the respective optical axes of the mutually most-distant two photoelectric elements of the photoelectric element array, and
wherein the first convex lens is formed to cause the respective optical signals from the optical transmission lines of the optical waveguide array to form parallel light, or collect the optical signals passed through the lens component into the optical transmission lines respectively,
the second convex lens is formed to cause the respective optical signals from the photoelectric elements of the photoelectric element array to form parallel light, or collect the optical signals passed through the lens component into the photoelectric elements respectively, and
the optical signals that have respectively formed the parallel light through the lens component cross each other substantially in one area.

2. The optical module according to claim 1, wherein:
the lens component is formed in a columnar shape, so that the first convex lens is formed at one end of the column, while the second convex lens is formed at the other end thereof.

3. The optical module according to claim 1, wherein:
the lens component is formed with a substantially rectangular parallelepiped lens block, so that the first convex lens is formed on one side of the lens block, while the second convex lens is formed on the opposite side to the side on which is formed the first convex lens.

4. The optical module according to claim 1, wherein:
the lens component is formed with a substantially rectangular parallelepiped lens block, so that the first convex lens is formed on one side of the lens block, while the second convex lens is formed on a side of the lens block orthogonal to the side on which is formed the first convex lens, and a mirror is formed in the lens block for joining the respective optical axes of the first and second convex lenses.

5. The optical module according to claim 1, wherein:
the lens component is formed with a substantially rectangular parallelepiped lens block, so that a pair of the first convex lenses are formed on one side of the lens block, while one second convex lens is formed on the opposite side of the lens block to one of the first convex lenses, and another second convex lens is formed on a side of the lens block orthogonal to the other of the first convex lenses, and a mirror is formed between said other first convex lens and said another second convex lens.

6. The optical module according to claim 4, wherein:
in the lens block is formed a hollow hole for forming the mirror at a position of joining the respective optical axes of the first and second convex lenses.

7. The optical module according to claim 5, wherein:
in the lens block is formed a hollow hole for forming the mirror at a position of joining the respective optical axes of the first and second convex lenses.

8. The optical module according to claim 3, wherein:
the lens component is formed with the substantially rectangular parallelepiped lens block formed of a material that forms the first and second convex lenses;
on one side of the lens block is formed a recessed portion whose aperture is substantially equal to the aperture of the first convex lens, so that the first convex lens is formed in the recessed portion; and
on the other side of the lens block is formed a recessed portion whose aperture is substantially equal to the aperture of the second convex lens, so that the second convex lens is formed in the recessed portion.

9. The optical module according to claim 4, wherein:
the lens component is formed with the substantially rectangular parallelepiped lens block formed of a material that forms the first and second convex lenses;
on one side of the lens block is formed a recessed portion whose aperture is substantially equal to the aperture of the first convex lens, so that the first convex lens is formed in the recessed portion; and
on the other side of the lens block is formed a recessed portion whose aperture is substantially equal to the aperture of the second convex lens, so that the second convex lens is formed in the recessed portion.

10. The optical module according to claim 8 wherein:
in the face of the lens block for forming the first or second convex lens is formed an engagement projection or an engagement groove positioned for engaging an external component such as an optical connector; and
the recessed portion is formed to a depth at which the focus of the second convex lens is positioned on the aperture plane of the recessed portion.

11. The optical module according to claim 9 wherein:
in the face of the lens block for forming the first or second convex lens is formed an engagement projection or an engagement groove positioned for engaging an external component such as an optical connector; and
the recessed portion is formed to a depth at which the focus of the second convex lens is positioned on the aperture plane of the recessed portion.

12. The optical module according to claim 1, wherein:
the focal distance of the first convex lens is different from the focal distance of the second convex lens.

13. The optical module according to claim 1, wherein:
the optical waveguide array comprises plural optical fibers arrayed one-dimensionally or two-dimensionally.

14. The optical module according to claim 1, wherein:
the photoelectric element array comprises plural light-receiving or light-emitting elements arrayed one-dimensionally or two-dimensionally.

15. The optical module according to claim 14, wherein:
the photoelectric element array is provided on a substrate, and a cap with an optically transparent window formed above the photoelectric element array is fixed to the substrate, for airtight sealing of the photoelectric element array.

* * * * *